United States Patent [19]

Gregg et al.

[11] Patent Number: 5,534,354

[45] Date of Patent: *Jul. 9, 1996

[54] MULTIPLE DENSITY SANDWICH STRUCTURES

[75] Inventors: Paul S. Gregg, Seattle; Matthew G. Kistner, Enumclaw; Jeff D. Will, Renton, all of Wash.

[*] Notice: The term of this patent shall not extend beyond the expiration date of Pat. No. 5,451,472.

[73] Assignee: The Boeing Company, Seattle, Wash.

[21] Appl. No.: 474,336

[22] Filed: Jun. 7, 1995

Related U.S. Application Data

[60] Continuation of Ser. No. 195,998, Feb. 14, 1994, Pat. No. 5,451,472, which is a division of Ser. No. 809,304, Dec. 19, 1991, Pat. No. 5,330,092.

[51] Int. Cl.$^6$ .............................. B32B 3/28; B32B 15/00; B64C 3/20
[52] U.S. Cl. .................. 428/593; 428/594; 428/636; 428/660; 244/123
[58] Field of Search .................................. 428/593, 660, 428/594, 636, 635, 586; 244/123

[56] References Cited

U.S. PATENT DOCUMENTS

| | | | |
|---|---|---|---|
| 2,190,490 | 2/1940 | Sendzimer | 189/34 |
| 2,212,481 | 8/1940 | Sendzimir | 428/586 |
| 2,266,858 | 12/1941 | Gehret | 170/159 |
| 2,333,343 | 11/1943 | Sendzimer | 29/188 |
| 2,754,572 | 7/1956 | Johnson | 29/157.3 |
| 2,787,049 | 4/1957 | Stalker | 29/156.8 |
| 2,954,208 | 9/1960 | Ewald et al. | 253/77 |
| 3,002,265 | 10/1961 | Stalker | 29/156.8 |
| 3,071,853 | 1/1963 | Price et al. | 29/471.1 |
| 3,072,225 | 1/1963 | Cremer et al. | 189/34 |
| 3,164,894 | 1/1965 | Johnson et al. | 29/412 |
| 3,567,407 | 3/1971 | Yoblin | 29/191.4 |
| 3,697,236 | 10/1972 | Shive | 29/191 |
| 3,927,817 | 12/1975 | Hamilton et al. | 228/157 |
| 4,136,846 | 1/1979 | Brault | 244/123 |
| 4,217,397 | 8/1980 | Hayase et al. | 428/594 |
| 4,292,375 | 9/1981 | Ko | 428/593 |
| 4,304,821 | 12/1981 | Hayase et al. | 428/593 |
| 4,530,197 | 7/1985 | Rainville | 52/797 |
| 4,577,798 | 3/1986 | Rainville | 228/157 |
| 4,582,544 | 4/1986 | Grimes et al. | 148/11.5 |
| 4,603,089 | 7/1986 | Bampton | 428/593 |
| 4,882,823 | 11/1989 | Weisert et al. | 29/6.1 |
| 5,016,805 | 5/1991 | Cadwell | 228/118 |
| 5,055,143 | 10/1991 | Runyan et al. | 148/11.5 R |
| 5,115,963 | 5/1992 | Yasui | 228/157 |
| 5,141,146 | 8/1992 | Yasui | 228/157 |
| 5,143,276 | 9/1992 | Mansbridge et al. | 428/593 |
| 5,289,965 | 3/1994 | Yasui et al. | 228/157 |
| 5,330,093 | 7/1994 | Bottomley et al. | 228/157 |

*Primary Examiner*—John Zimmerman
*Attorney, Agent, or Firm*—Christensen O'Connor Johnson & Kindness

[57] ABSTRACT

A method to superplastic form sandwich structures is provided. A series of worksheets are joined together at selected locations through the use of partial penetration welding. The worksheets are subsequently superplastic formed in order to form a sandwich structure. The method allows a different number of worksheets to be used at different points throughout the sandwich structure. This results in a sandwich structure with a different internal reinforcement at different locations in the sandwich structure. In the preferred embodiment, a wing is fabricated from a series of worksheets partial penetration welded together using a laser. The worksheets are superplastic formed to producing a wing with a different internal reinforcement at two or more locations in the wing. The wing includes a pair of double thickness skins that define a major portion of aerodynamically smooth outer surface of the airfoil. Each skin is formed from at least two sheets of superplastically formed material that are joined by diffusion bonding. The internal reinforcement extends between the surface's interior surfaces of the skins and are welded to the skins by wave welds. The webs of the internal reinforcement extend between the skins diagonally and each web is formed of a single sheet of superplastically formed material.

14 Claims, 6 Drawing Sheets

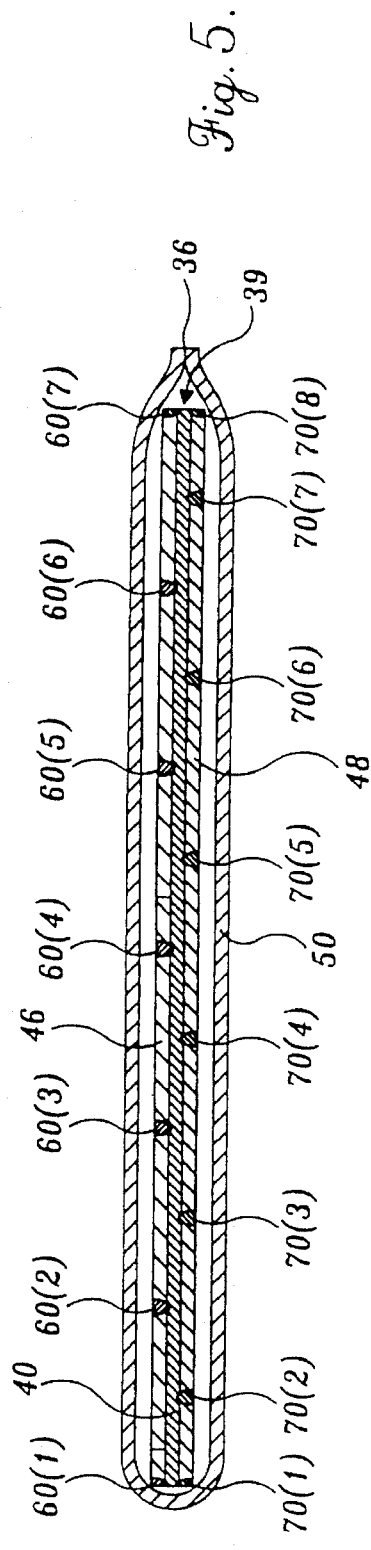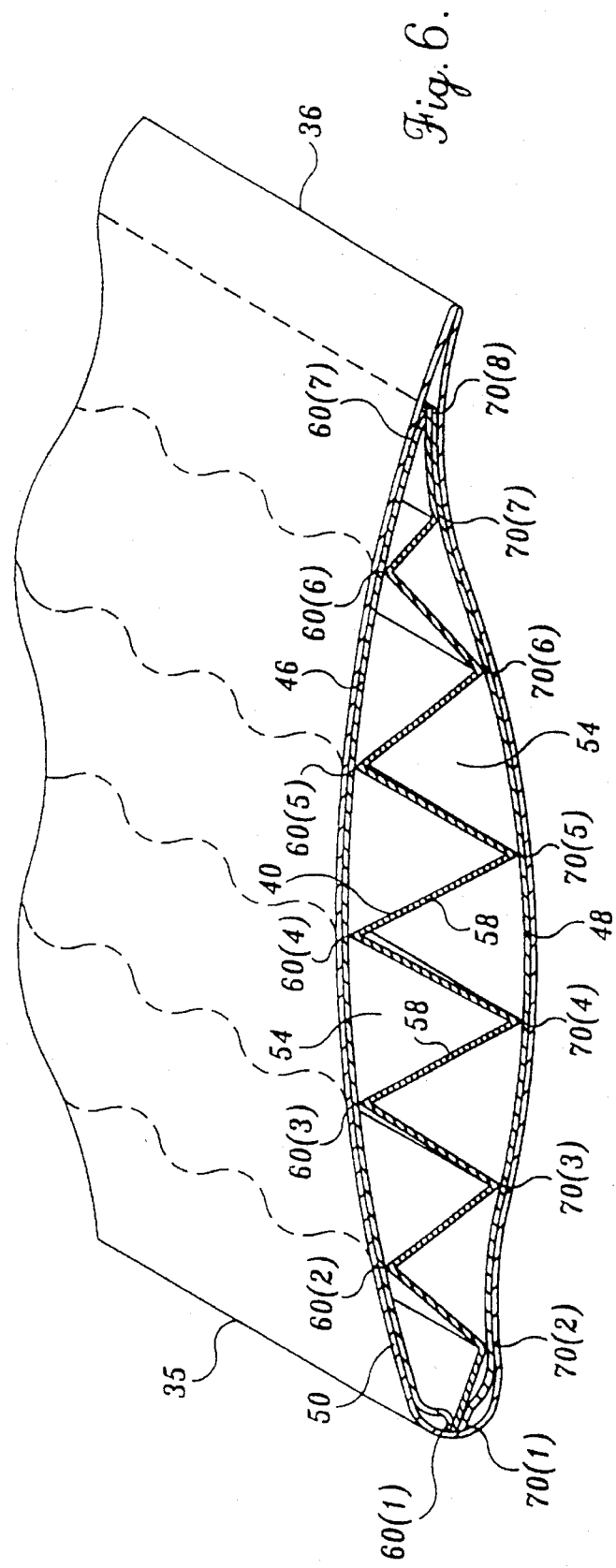

MULTIPLE DENSITY SANDWICH STRUCTURES

This is a continuation of the prior application Ser. No. 08/195,998, filed on Feb. 11, 1994, now U.S. Pat. No. 5,451,472, which in turn is a divisional of application Ser. No. 07/809,304, filed on Dec. 17, 1991, issued on Jul. 19, 1994 as U.S. Pat. No. 5,330,092, the benefit of the filing dates of which are hereby claimed under 35 U.S.C. §120.

FIELD OF THE INVENTION

The present invention relates to superplastic forming of sandwich structures.

BACKGROUND OF THE INVENTION

Under certain conditions, some materials can be plastically deformed without rupture well beyond their normal limits, a property called superplasticity. This property is exhibited by certain metals and alloys within limited ranges of temperature and strain rate. For example, titanium alloys are superplastic in the temperature range 1450°–1850° F.

Superplastic forming (SPF) is a fabrication technique that relies on superplasticity. A typical SPF process involves placing a sheet of metal in a tool, heating the sheet to an elevated temperature at which it exhibits superplasticity, and then using a gas to apply pressure to one side of the sheet. The pressure stretches the sheet and causes it to assume the shape of the tool surface. The pressure is selected to strain the material at a strain rate that is within its superplasticity range at the elevated temperature.

One advantage of SPF is that very complex shapes can be readily formed. In addition, the SPF process is generally applicable to single and multi-sheet fabrication, and can be combined with joining processes such as diffusion bonding to produce complex sandwich structures at a relatively low cost. The simplicity of the SPF process leads to lighter and less expensive parts with fewer fasteners, and higher potential geometric complexity. Applications of SPF include the manufacturing of parts for aircraft and other aerospace structures.

The SPF process is often used to form sandwich structures which have a complex exterior surface geometry and an integral internal structural core. This core is used to stabilize the exterior surface geometry and to provide shear strength and stiffness to the structure.

One method to superplastic form sandwich structures is described in Hamilton et at., U.S. Pat. No. 3,927,817. In Hamilton, a sandwich structure is formed by joining three metallic worksheets together at selected areas. The worksheets are joined by first masking the areas of the worksheets where joining is not desired. Masking prevents the masked areas from joining during SPF. The worksheets are then placed adjacent to each other and heated to temperatures at which diffusion bonding is possible. Pressure is applied to the worksheets in order to cause the worksheets to diffusion bond together at the locations where no masking agent was used. The joined worksheets are then placed in a forming tool having a surface that defines the exterior surface of the formed structure. A pressure differential is then applied between the interior and the exterior of the worksheets. This pressure differential, combined with heating the worksheets to superplastic forming temperatures, results in the upper and lower worksheets superplasticly deforming to the shape of the tool surface. As the upper and lower worksheets expand, the middle worksheet forms a core structure. The locations at which the worksheets are joined together define the subsequent shape of the interior core structure.

An example of a sandwich structure formed with the method described in Hamilton is shown in FIG. 1. The sandwich structure consists of a coresheet 10 that is alternately joined to an upper sheet 14 and a lower sheet 16 along joints 12. The Hamilton method is commonly referred to as the "three sheet method." The "three sheet method" produces a sandwich structure with an internal truss core. The truss is formed from coresheet 10 and has webs 11 that extend diagonally between upper sheet 14 and lower sheet 16. These diagonal webs provide very good shear support and shear stiffness for the sandwich structure.

One problem with the "three sheet method" is that it results in surface grooving 18 or surface nonuniformity along joints 12 where coresheet 10 attaches to upper sheet 14 and lower sheet 16. Surface grooving 18 results at joints 12 due to the forces exerted on upper and lower sheets 14 and 16 by coresheet 10 during SPF. These forces prevent upper and lower sheets 14 and 16 from fully forming into the shape of the tool surface. Surface grooving 18 must be filled or covered when a smooth outer surface is required. Additionally, surface grooving 18 reduces the strength and stiffness of the finished structure.

Surface grooving 18 can be minimized by making upper sheet 14 and lower sheet 16 thicker (e.g. three times thicker) than coresheet 10. This stiffens the upper and lower sheets and reduces the effects of the forces applied by coresheet 10. However, thicker sheets result in a much heavier structure unless expensive chemical milling operations are used to remove extra material in the sheets.

In addition to the problems associated with surface grooving 18, the "three sheet method" has other disadvantages. The use of masking agents to prevent joining of the worksheets is time consuming and expensive. Additionally, the masking agents prevent the formed structure from being used in locations where contaminants cannot be tolerated. As an example, masking agents prevent the "three sheet method" from being used in "wet areas" of an aircraft structure. Wet areas are locations that are filled with aircraft fuel. Masking agents would contaminate any aircraft fuel located in these areas.

Another commonly used superplastic forming method is described in two patents to Hayase et at., U.S. Pat. No. 4,217,397 and U.S. Pat. No. 4,304,821. As shown in FIG. 2, a sandwich structure fabricated with the Hayase method uses two coresheets 20 and 22 which are welded to one another at selected areas 24. An upper cover 26 and lower cover 28 are placed over the coresheets. The resulting assembly is placed within a tool having a surface that defines the exterior surface of the formed sandwich structure. In the Hayase method, the assembly is heated to superplastic forming temperatures and a pressure differential is placed between the interior and exterior surface of covers 26 and 28 resulting in superplastic forming of the cover sheets. A pressure differential is then placed between the interior and exterior of coresheets 20 and 22 resulting in superplastic forming of the coresheets. Superplastic forming of the coresheets continue until coresheets 20 and 22 contact covers 26 and 28 and diffusion bond to them. This method, also known as the "four sheet method," eliminates surface grooving because cover sheets 26 and 28 are formed prior to forming the coresheets.

The four sheet method results in a number of new problems. It produces a core structure with webs 23 normal to cover sheets 26 and 28. In some respects, this type of core structure is not as structurally efficient in shear as a core structure with diagonal webs which form a truss. The four sheet method also results in excessive thinning at the 90° corners 30, formed at the location where coresheets 20 and 22 contact cover sheets 26 and 28. This excessive thinning is a result of forming the small radius of curvature corners 30 preferred in the Hayase method. Furthermore, a longer processing cycle than the "three sheet method" must be used in order to allow time for coresheets 20 and 22 to form corners 30. The increased processing time increases costs and decreases part output.

Both the Hayase method and the Hamilton method form sandwich structures having the same internal reinforcement or number coresheets throughout the sandwich structure. A uniform internal reinforcement limits the structural engineer's ability to tailor superplastic formed sandwich structures to applications that have differing loads throughout the structure. Therefore, the structural engineer must design the entire internal reinforcement for the peak structural loading expected in the part. This results in an increased weight and a loss of structural efficiency.

SUMMARY OF THE INVENTION

The present invention provides an improved sandwich structure and an improved method for superplastically forming sandwich structures. The method reduces problems with grooving and thinning in corners associated with prior art superplastic forming operations. The present invention also allows structural engineers to tailor the internal reinforcement of the sandwich structure to take account for differing loads throughout the sandwich structure. This ability to tailor the internal reinforcement decreases weight and increases structural efficiency.

According to one aspect of the present invention, a sandwich structure that includes upper and lower sheets and a plurality of mutually interconnected webs extending between the upper and lower sheets is fabricated. First, second, and third worksheets are positioned into a stack. The worksheets are positioned so that there are a different number of worksheets in the sack at two or more different locations in the stack. The first, second and third worksheets are joined together such that the first worksheet is joined to the second worksheet at one or more first locations without being joined to the third worksheet at the first locations. Similarly, the third worksheet is joined to the second worksheet at one or more second locations without being joined to the first worksheet at the second locations. Additionally, the first locations are different from the second locations. The stack is then superplastically formed so as to form a sandwich structure with a different number of webs at two or more different locations in the sandwich structure.

According to other aspects of the invention, at least one of the webs extends at an angle not perpendicular to the upper and lower sheets. The sandwich structure also includes a skin that encloses the upper and lower sheets. One or more skin sheets are positioned around the stack and superplastically formed so as to form the skin. Furthermore, the worksheets are joined together using a laser.

One embodiment of the present invention includes upper and lower sheets and first, second, and third worksheets that are joined together such that the first worksheet is joined to the second worksheet at one or more first locations without being joined to the third worksheet at the first locations. Similarly, the third worksheet is joined to the second worksheet at one or more second locations without being joined to the first worksheet at the second locations. Additionally, the first locations are different from the second locations. The worksheets form a plurality of mutually interconnected webs extending between the upper and lower sheets. A different number of webs are located at two or more different locations in the sandwich structure.

Other aspects of the invention include at least one skin sheet enclosing the upper and lower sheets such that the upper and lower sheets are attached to the skin sheets only by a diffusion bond. Furthermore, at least one of the webs extends at an angle not perpendicular to the upper and lower sheets. Other aspects of the invention include joining the worksheets together by welding with a laser.

A second embodiment of the present invention includes an upper and lower sheet and an internal reinforcement. The internal reinforcement comprises first, second and third worksheets joined together such that the first worksheet is joined to the second worksheet at one or more first locations without being joined to the third worksheet at the first locations. Similarly, the third worksheet is joined to the second worksheet at one or more second locations without being joined to the first worksheet at the second locations. Furthermore, the first locations are different from the second locations. The first, second and third worksheets form a plurality of mutually interconnected webs that extend between the upper and lower sheets. The upper and lower sheets are joined to the internal reinforcement only by a diffusion bond.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings.

FIG. 5 is a cross section of the wing at the location shown in FIG. 3 prior to superplastic forming.

FIG. 6 is a cross section of the wing at the location shown in FIG. 3 after superplastic forming.

DETAILED DESCRIPTION OF THE PREFERRED EMBODIMENT

The method of superplastic forming according to the present invention allows the user to fabricate sandwich structures with an internal reinforcement that can be locally stiffened and strengthened. This internal reinforcement supports the upper and lower surfaces of the sandwich structure. The internal reinforcement consists of a series of interconnected walls or webs which extend between the surfaces of the sandwich structure. These walls or webs are superplastically formed from a series of worksheets.

The present invention allows a different number of worksheets to be located at different locations in the sandwich structure. This allows the internal reinforcement to be superplastically formed with a different number of worksheets and thus webs or walls at different locations in the sandwich structure. Therefore, the internal reinforcement can be tailored to withstand different loadings at different locations throughout the structure. The resulting structure is optimally tailored to transfer structural loads, thus reducing weight and increasing structural efficiency.

Figure 1:
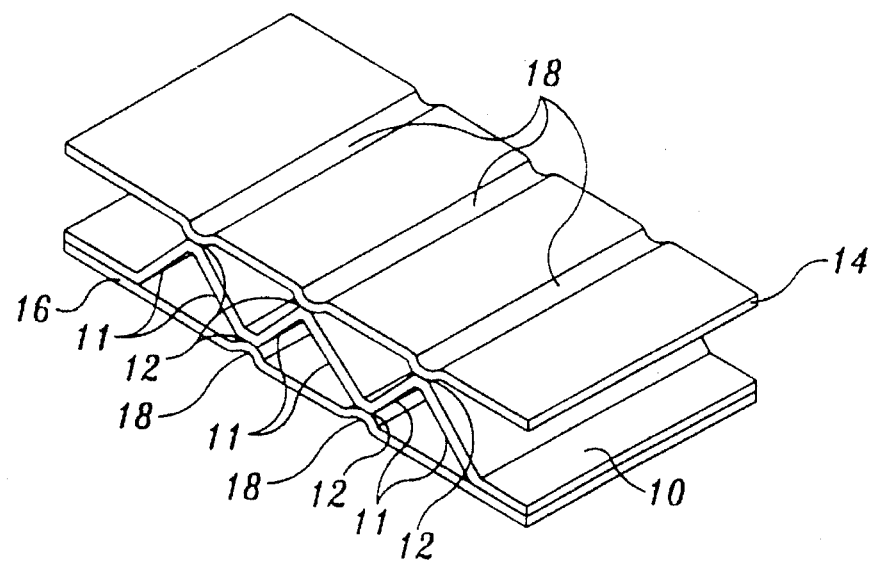
FIG. 1 is a perspective view of a sandwich structure fabricated with the Hamilton method.
Figure 2:
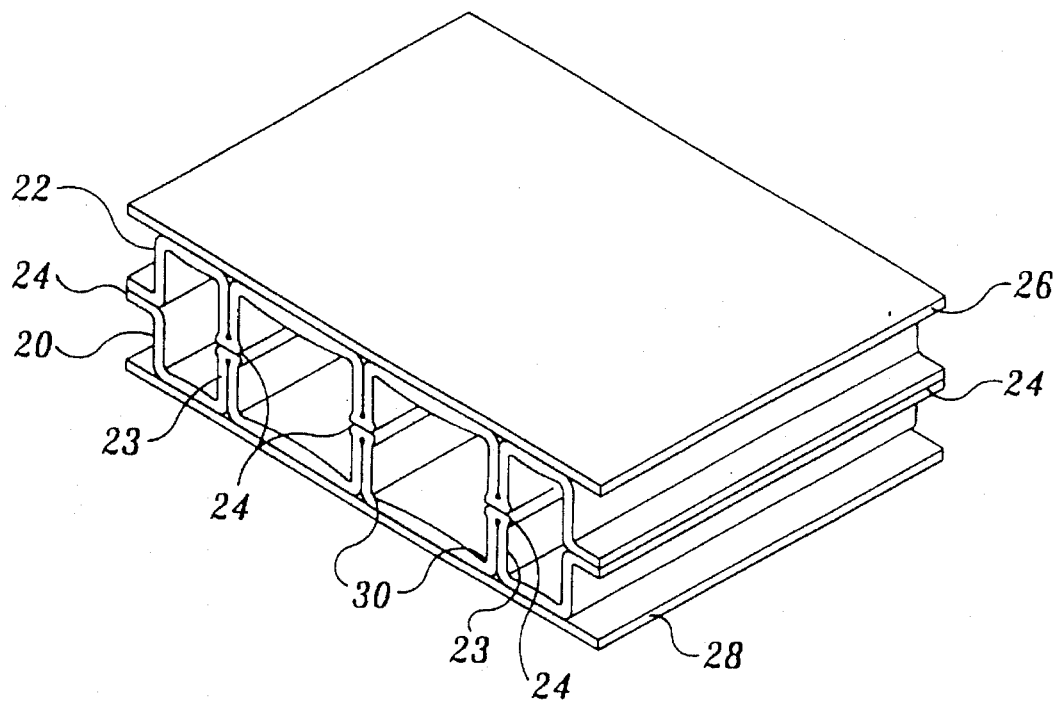
FIG. 2 is a perspective view of a sandwich structure fabricated with the Hayase method.
Figure 3:
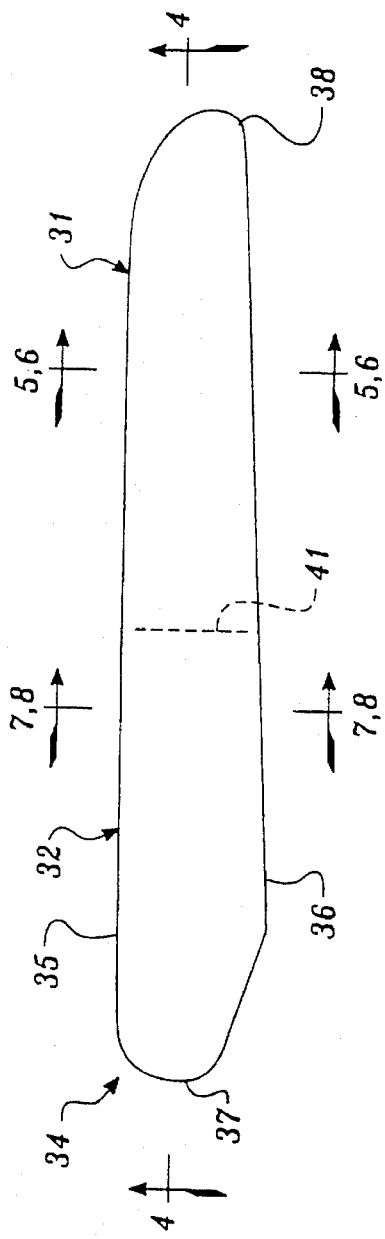
FIG. 3 is a top plan view of a wing fabricated with the superplastic forming method of the present invention.
Figure 4:
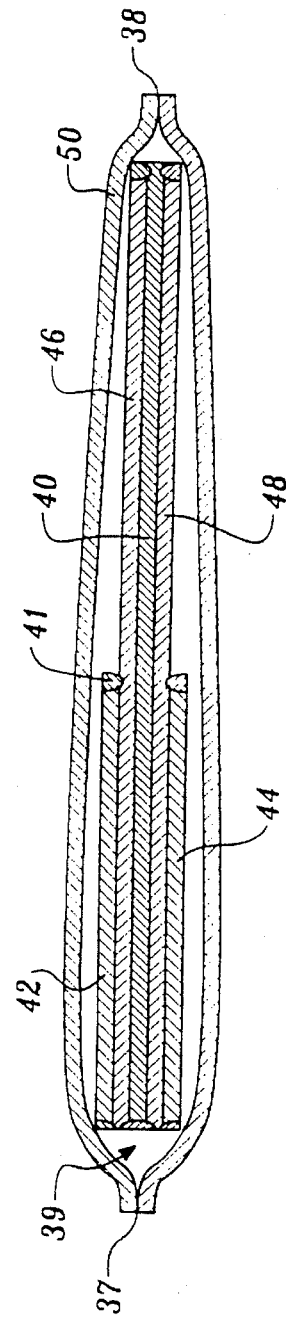
FIG. 4 is a span-wise cross section of the wing at the location shown in FIG. 3 prior to superplastic forming.

FIG. 3 is a top plan view of a wing 34 fabricated in accordance with the present invention. Wing 34 includes a leading edge 35, trailing edge 36, wing tip 38 and wing root 37. Wing 34 is fabricated by first determining wing loading and the subsequent wing structure necessary to withstand the wing loading. After determining the structural reinforcement necessary throughout wing 34, a plurality of worksheets are cut and arranged to form a stack 39 (FIG. 4). A skin 50 is also cut and placed around the stack 39. The worksheets and skin are formed of a material having superplastic properties, such as titanium alloys. Particularly suitable materials for wing 34 are titanium alloys, due to their superplastic formability, ability to be easily diffusion bonded, and their high strength and stiffness. Sheet thicknesses for superplastic forming vary with materials and applications, but typically range from 0.016 to 0.1 inches (0.41 to 2.5 mm). Wing 34 uses a sheet thickness of 0.032 inches (0.81 mm) in order to carry the expected structural loads.

The present invention allows wing 34 to be fabricated with two structurally distinctive sections along its span. The outboard section 31 near wing tip 38 is not as highly loaded in shear as the inboard section 32 near wing root 37. Therefore, the inboard section 32 preferably has a stronger and stiffer internal reinforcement than the outboard section 31. The transition from inboard section 32 to outboard section 31 occurs at drop-off 41. In prior art superplastic forming operations, the internal reinforcement would be formed of the same number of worksheets throughout the sandwich structure. In the embodiment shown, this would result in the entire internal reinforcement being designed to withstand the higher loads located in the inboard section 32. Therefore, wing 34 would be heavier than necessary due to the extra internal reinforcement located in outboard section 31.

FIGS. 4–8 illustrate the structural details of wing 34 at the locations shown in FIG. 3. FIG. 4 shows a span wise cross section of the stack 39 that is subsequently superplastically formed into wing 34. The stack 39 includes a center coresheet 40 and top and bottom coresheets 46 and 48 that run the length of wing 34. In order to reinforce the inboard section 32, an upper reinforcement 42 and lower reinforcement 44 are placed on the exterior surfaces of top and bottom coresheets 46 and 48, respectively, and run from wing root 37 to drop-off 41. The upper and lower reinforcements 42 and 44 extend partially between leading edge 35 and trailing edge 36 as shown in FIG. 5.

FIG. 5 shows a cross section of the wing 34 at the location shown in FIG. 3, after welding but prior to superplastic forming. This cross section is outboard of the drop-off 41 where the upper and lower reinforcements 42 and 43 end. FIG. 6 shows a cross section of the wing 34 at the same location as FIG. 5 after superplastic forming. The top coresheet 46 is welded to the center coresheet 40 at first weld points 60(1–7) while the bottom coresheet 48 is welded to the center coresheet 40 at second weld points 70(1–8). The top coresheet 46 is welded to the center coresheet 40 at locations which are different from the locations where the bottom coresheet 48 is welded to the center coresheet 40, except around the perimeter as noted by weld points 60(1 and 7) and 70(1 and 8). Preferably, each weld point is a wave weld running from the wing root 37 to the wing tip 38, however, each weld line could also be a straight line or other weld pattern (as an example, weld lines 60(2–7) are shown in phantom in FIG. 6). The weld pattern described above produces an internal reinforcement having diagonal webs 58 (FIG. 6) after superplastic forming.

In order to produce an internal reinforcement having diagonal webs 58, the center coresheet 40 must be alternately attached to the top and bottom coresheets 46 and 48. One method to joint the center coresheet 40 to the top and bottom coresheets 46 and 48 in this manner is to use the masking procedure described in Hamilton. However, this would result in the disadvantages described above. Another method to alternately join the center coresheet to the top and bottom coresheet is to weld them together. However, the welding operation must be capable of welding two worksheets together with access from only one side of the worksheets.

In order to weld the top and bottom coresheets to the center coresheet with access from only one side, a welding operation capable of partial penetration welding is preferred. Partial penetration welding has the ability to weld to a controlled depth with access for only one side of the part. This allows the top coresheet 46 to be welded to the center coresheet 40 without penetrating through the center coresheet to the bottom coresheet 48.

Partial penetration welding is preferably accomplished through the use of the carefully controlled laser. A number of commonly used commercially available lasers can be used in partial penetration welding operations. The preferred embodiment uses a $CO_2$ laser to apply a controlled laser energy to the locations where welding is desired. The laser energy may be vaned in order to control the depth of penetration in the quality of the resulting weld. Laser partial penetration welding of sandwich structures is described in more detail in U.S. Pat. No. 4,603,089.

Figure 7:
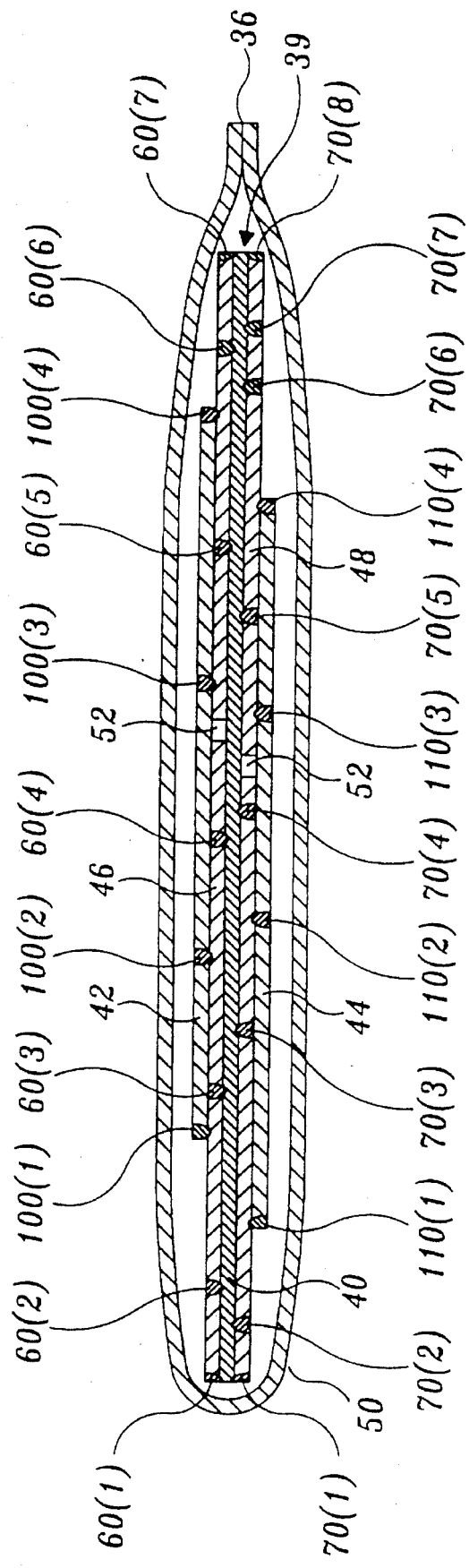
FIG. 7 is a cross section of the wing at the location shown in FIG. 3 prior to superplastic forming.
Figure 8:
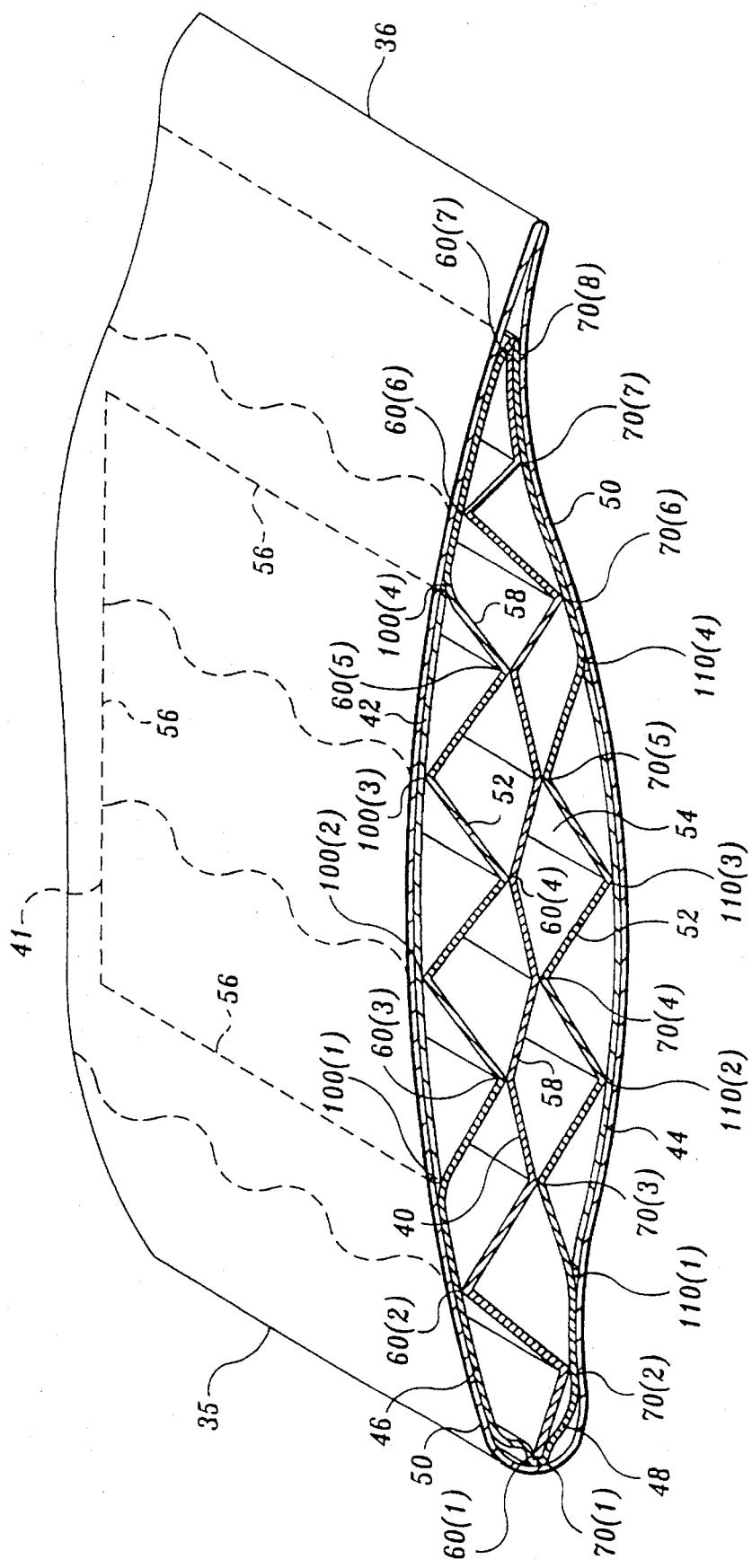
FIG. 8 is a cross section of the wing at the location shown m FIG. 3 after superplastic forming.

After welding the top and bottom coresheets to the center coresheet, forming a stack, the upper and lower reinforcements 42 and 44 are welded to opposing sides of the stack. As shown in FIGS. 7 and 8, the upper reinforcement 42 is welded to the top coresheet 46 at weld points 100(1–4). Similarly, the lower reinforcement 44 is welded to the bottom coresheet 48 at weld points 110(1–4). The upper reinforcement 42 is welded to the top coresheet 46 at locations different from the locations where the top coresheet 46 is welded to the center coresheet 40. Similarly, the lower reinforcement 42 is welded to the bottom coresheet 48 at locations which are different from the locations where the bottom coresheet 48 is welded to the center coresheet 40. Each weld point 100 and 110 corresponds to a weld line running from the wing root 37 to the drop-off 41 where the upper and lower reinforcements end. As shown in FIG. 8, the upper reinforcement 42 is also welded to the top coresheet 46 around its perimeter 56. Similarly, the lower reinforcement 44 is welded to the bottom coresheet 48 around its perimeter (not shown).

This weld configuration results in an internal reinforcement having diagonal webs 58 after superplastic forming (FIG. 8). By welding the upper and lower reinforcements 42 and 44 into the stack of worksheets 39 in the arrangement discussed, the structural density or number of reinforcing webs 58 can be varied throughout the sandwich structure.

After partial penetration welding the upper and lower reinforcements 42 and 44 into the stack 39, an outer skin 50 is placed around the stack. The skin 50 begins at the trailing edge 36 and is wrapped around the stack 39 in order to form the upper and lower covers of the wing 34 (FIGS. 6 and 8). The skin 50 is not welded to the top or bottom coresheets 46 and 48 or the reinforcements 42 and 44. After wrapping the skin 50 around the stack 39, the perimeter of the skin 50 is welded along the trailing edge 36, wing tip 38 and wing root 37. This forms the skin 50 into an envelope enclosing the stack 39. The skin 50 is welded around the perimeter such that a gas tubing (not shown) extends in to the envelope formed by the skin. This allows a pressure differential to be placed within the envelope formed by the skin and between the worksheets which form stack 39.

The combined assembly, including stack 39 and skin 50 is placed within a preheated forming tool (not shown). This tool is maintained at superplastic forming temperatures and includes a forming surface which corresponds to the exterior surface of the wing 34. Stack 39 and skin 50 are then heated to superplastic forming temperatures. Superplastic forming temperatures for titanium and its alloys are in the temperature range of 1,450°–1,850° F.

After reaching superplastic forming temperatures, a pressure differential is placed between the interior and exterior surfaces of the skin 50 using conventional superplastic forming equipment. The pressure differential is created by pumping argon gas into the envelope formed by the skin 50. Argon gas is used in order to preclude oxidation of the titanium worksheets during the forming operation. The pressure differential is selected to strain the skin 50 at a strain rate that is within its superplasticity range at superplastic forming temperatures. The pressure differential causes the skin 50 to superplastically form until it contacts and conforms to the shape of the forming surface.

After superplastic forming of skin 50, a pressure differential is placed between the individual worksheets which make up stack 39, as described below. This pressure differential causes the stack 39 to superplastically form until top and bottom coresheets 46 and 48 contact and conform to the shape of the superplastically formed skin 50. The deformation of stack 39 is limited by the interconnecting series of welds between worksheets. In this embodiment, the welds cause center coresheet 40 and upper and lower reinforcements 42 and 44 to form an internal reintforcement characterized by a series of webs 58 and internal chambers 54 (FIGS. 6 and 8).

In order to assist in placing a pressure differential between each of the worksheets that form stack 39, the embodiment shown preferably uses a series of gas passages 52. Gas passages 52 are placed in the worksheets prior to partial penetration welding the worksheets together. An example of gas passages 52 is shown in FIG. 7 prior to superplastic forming and the subsequent position of passages 52 is shown in FIG. 8 after superplastic forming. The gas passages 52 are located throughout the worksheets such that there is at least one gas passage into each chamber 54. Gas passages 52 allow a pressure differential placed between the interior and exterior of stack 39 to pressurize all of the internal chambers 54. The pressure differential is applied using conventional SPF procedures. The pressure differential causes stack 39 to expand and form interior chambers 54. Each chamber 54 is defined by a series of interconnected webs 58.

Unlike the "three sheet process," by first forming skin 50 and then forming the internal reinforcement, the method of the present invention creates a smooth exterior surface, formed by skin 50, free of surface nonuniformities and "grooving." The method of the present invention also results in an internal reinforcement where the webs 58 (FIGS. 6 and 8) run at angles not perpendicular to the surface of skin 50. This reduces problems associated with the "four sheet process" due to excessive thinning at the corners and longer processing times while maintaining the added shear strength and stiffness of diagonal webs 58.

Placing upper and lower reinforcements 42 and 44 on stack 39 and selectively welding them to top and bottom coresheets 46 and 48 allows the SPF of wing 34 with a variable degree of internal reinforcement. The internal reinforcement can be tailored to withstand the structural loads acting on the wing. In the embodiment shown, the internal reinforcement includes one internal reinforcement running from the wing root 37 to drop-off 41 and a second running from drop-off 41 to wing tip 38. Although the embodiment shown has only two different internal reinforcements, any number of different internal reinforcements can be used.

As shown in FIG. 6, outer skin 50 is superplastically formed to the exterior shape of an airfoil. Top and bottom coresheets 46 and 48 are superplastically formed until they lie adjacent to outer skin 50. Due to the pressure differential applied between the interior and exterior of stack 39 and the SPF temperatures, the top and bottom coresheets 46 and 48 diffusion bond to the outer skin 50 forming an integral wing structure. Similarly, the upper and lower reinforcements diffusion bond to the outer skin 50 (FIG. 8).

Figure 9:
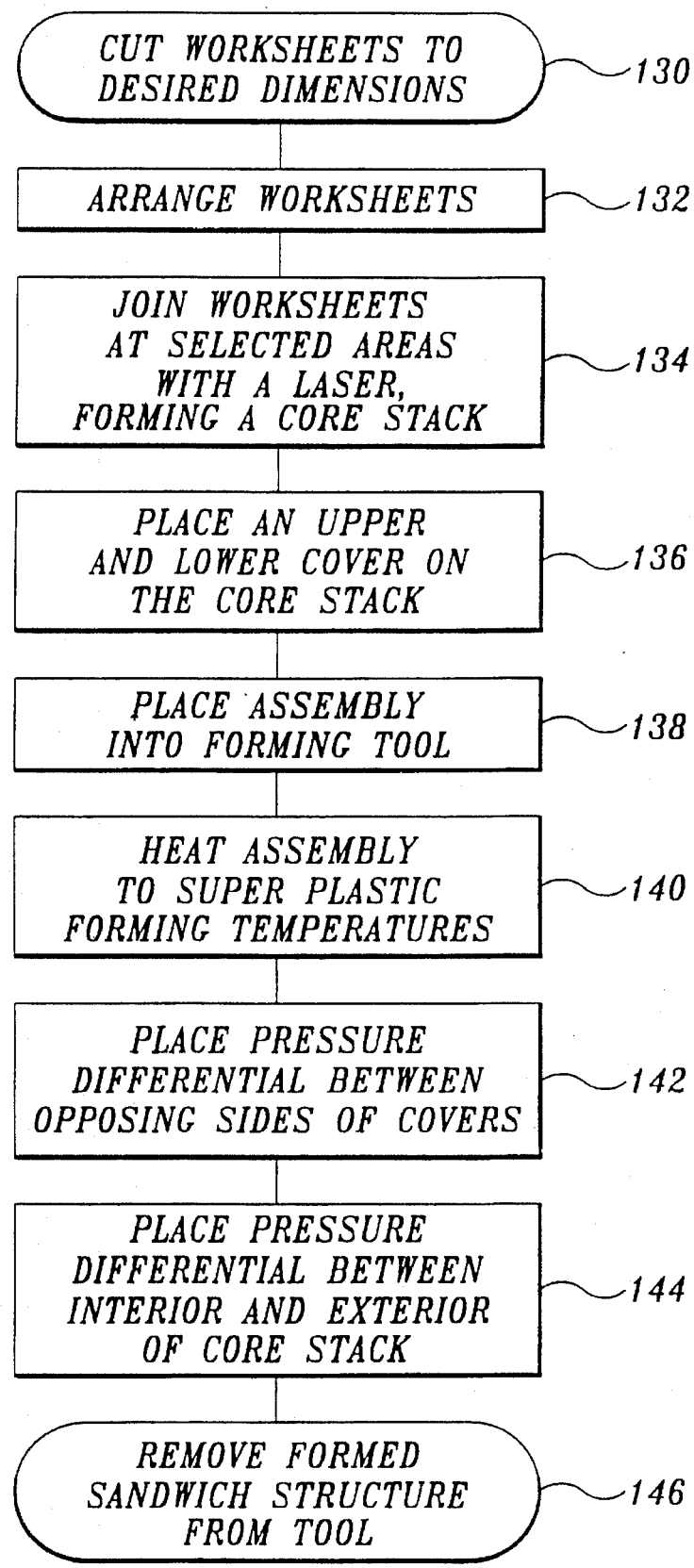
FIG. 9 is a flow chart showing the steps used to fabricate the wing of FIG. 3.

FIG. 9 shows the manufacturing steps used to fabricate wing 34. First, a series of worksheets are cut to the desired dimensions as shown in step 130. These worksheets are then positioned in step 132 in preparation for joining operations. As shown in step 134, the worksheets are joined together at the selected areas with a laser. In this step, top and bottom coresheets 46 and 48 are joined to center coresheet 40 anti the upper and lower reinforcements 42 and 44, thus forming a stack 39. Skin 50 is then placed around the stack 39, forming an upper and lower cover as indicated in step 136.

In step 138, the combined assembly comprising stack 39 and skin 50 is placed into a preheated forming tool. The forming tool has a forming surface corresponding to the exterior surface of wing 34. As indicated in step 140, the assembly is heated to superplastic forming temperatures. A pressure differential is then placed between the interior and exterior of the skin as indicated in step 142. This pressure differential causes skin 50 to be superplastically formed until it conforms with the forming surface of the tool. As indicated in step 144, a pressure differential is then placed between the interior and exterior of stack 39. This pressure differential combined with the SPF temperatures results in the stack forming webs 58 and internal chambers 54. The pressure differential is maintained until top and bottom coresheets 46 and 48 diffusion bond to skin 50. The final sandwich structure or wing 34 is then removed from the forming tool as indicated in step 146.

While the preferred embodiment of the present invention has been illustrated and described, it will be appreciated that various changes can be made therein without departing from the spirit and scope of the invention. Although the embodiment shown is a wing, the present invention can be used to SPF an infinite number of structures. The present invention allows the fabrication of sandwich structures with different internal reinforcements at different locations in the structures. Possible internal reinforcements could include a truss structure as shown or numerous other types of reinforcement. As an example, a series of welds between coresheets running from leading edge 34 to trailing edge 36 could be added. These added welds force the internal reinforcement to be an egg-crate type structure, as opposed to the truss core structure shown in the present embodiment. Similarly, although the preferred embodiment only includes two different internal reinforcements, alternative embodiments could use any number of reinforcements at desired locations.

The embodiments of the invention in which an exclusive property, or privilege is claimed are defined as follows:

1. A superplastically formed sandwich structure airfoil formed from a pack of sheets of substantially uniformly thick superplastic material, comprising:
    (a) a pair of double thickness skins defining a major portion of an aerodynamically smooth outer surface of the airfoil, each skin being formed from at least two, bonded sheets of superplastically formed material that are joined by diffusion bonding; and
    (b) an internal web reinforcement of superplastically formed material attached to and extending between the interior surfaces of the skins, the reinforcement including welded beads joining the reinforcement to the skins at selected locations and a plurality of webs that extend diagonally between the welded beads and between the skins, each web being formed of a single sheet.

2. The structure of claim 1, wherein the reinforcement includes at least three sheets that are sandwiched together and that are welded at selected locations such that the number of webs formed from one outer sheet of the three sheets differs from the number of webs formed from another outer sheet of the three sheets and, wherein the structure is tailored to withstand different loadings at different locations throughout the structure because of the differing density in the webs.

3. The structure of claim 1, wherein the welded beads joining the reinforcement to the skins is a wave weld.

4. The structure of claim 1, wherein there is a different number of sheets located through the thickness of the structure at at least two different locations along the span of the structure of the airfoil.

5. The structure of claim 1, wherein there is at least two different numbers of sheets through the thickness of the sandwich structure at at least two different locations along the cord of the airfoil.

6. A superplastically formed sandwich structure made from a plurality of sheets of superplastically formed titanium alloy, comprising:
    (a) a double thickness skin formed from at least two sheets of titanium alloy joined by diffusion bonding, wherein the double thickness reduces dimpling of the outer surface otherwise occurring during the superplastic forming;
    (b) an internal reinforcement joined to the skins with welded beads at spaced, selected locations, the internal reinforcement being formed of a plurality of interconnected webs that extend diagonally between the upper and lower portions of the skin, wherein the skins define an envelope that encloses the internal reinforcement and that defines an upper and lower portion of the skin; and wherein the upper and lower portions of the skin are contoured to form an airfoil having an aerodynamically smooth outer surface.

7. The structure of claim 6, wherein there are different numbers of webs at two or more locations through the thickness of the sandwich structure so that the structure can withstand different loadings at different locations throughout the structure.

8. The structure of claim 6, wherein the welded beads joining the reinforcement to the skins are wave welds.

9. The structure of claim 6, wherein there is a different number of sheets located through the thickness of the airfoil at at least two different locations along the span of the structure of the airfoil.

10. The structure of claim 6, wherein there is at least two different numbers of sheets through the thickness of the sandwich structure at at least two different locations along the cord of the airfoil.

11. A superplastically formed sandwich structure comprising:
    at least five sheets joined together to form upper and lower skins and a webbed internal reinforcement, two of said sheets joined together by diffusion bonding over the majority of the surface to form the upper skin, two of said sheets joined together by diffusion bonding over the majority of the surface to form the lower skin and the internal reinforcement being formed of one of said sheets joined to the upper and lower skin sheets by welding to form a plurality of webs that extend diagonally between the upper and lower skins.

12. An airfoil, comprising:
    (a) a double thickness upper skin having an aerodynamically smooth outer surface, the upper skin formed of two or more sheets joined by diffusion bonding;
    (b) a double thickness lower skin having an aerodynamically smooth outer surface, the lower skin being formed of two or more sheets of superplastically formable material joined by diffusion bonding; wherein the upper and lower skins are joined together to define the outer contour of the airfoil; and
    (c) an internal webbed reinforcement of superplastically formable material attached to and extending between the interior surfaces of the upper and lower skins, the internal reinforcement including a plurality of interconnected webs that extend diagonally between the upper and lower skins, the internal reinforcement having a different number of webs through the thickness of the internal reinforcement at at least two different locations along the span of the airfoil, and a different number of webs through the thickness of the internal reinforcement at at least two different locations along the cord of the wing so that the airfoil can withstand different loadings at different locations because of the differing density of the webs.

13. The airfoil of claim 12, wherein the internal reinforcement is formed of two or more sheets welded at selected locations and thereafter superplastically formed to form an expanded webbed core.

14. The structure of claim 12, wherein the welded beads joining the reinforcement to the skins are wave welds.

* * * * *

UNITED STATES PATENT AND TRADEMARK OFFICE
CERTIFICATE OF CORRECTION

PATENT NO. : 5,534,354
DATED : July 9, 1996
INVENTOR(S) : P.S. Gregg et al.

It is certified that error appears in the above-indentified patent and that said Letters Patent is hereby corrected as shown below:

On the title page,

| item, [60] col. 1 | Related U.S. App. Data | "Dec. 19, 1991," should read --Dec. 17, 1991,-- |
|---|---|---|
| item, [57] Pg. 1, col. 2 | Abstract Line 15 of text | After "portion of" insert --the-- |
| Col. 9, | line 10, | After "property" delete --,-- |

Signed and Sealed this

Twenty-ninth Day of October 1996

*Attest:*

BRUCE LEHMAN

*Attesting Officer*    Commissioner of Patents and Trademarks